United States Patent [19]

Hawrylo

[11] Patent Number: 4,491,264

[45] Date of Patent: Jan. 1, 1985

[54] METHOD OF SOLDERING A LIGHT EMITTING DEVICE TO A SUBSTRATE

[75] Inventor: Frank Z. Hawrylo, Trenton, N.J.

[73] Assignee: RCA Corporation, New York, N.Y.

[21] Appl. No.: 383,988

[22] Filed: Jun. 1, 1982

[51] Int. Cl.³ ............................................. B23K 31/02
[52] U.S. Cl. .................................... 228/121; 228/190
[58] Field of Search ............... 228/121, 122, 190, 225; 29/569 L, 589; 357/81; 372/36; 269/903, 902

[56] References Cited

U.S. PATENT DOCUMENTS

| | | | |
|---|---|---|---|
| 3,273,979 | 9/1966 | Budnick | 228/122 X |
| 3,593,412 | 7/1971 | Foote | 29/589 |
| 3,607,148 | 9/1971 | Foote | 29/195 |
| 3,733,182 | 5/1973 | Crosslond et al. | 228/122 X |
| 3,946,334 | 3/1976 | Yonezu et al. | 331/94.5 H |
| 3,996,548 | 12/1976 | Chaffin | 228/122 X |
| 4,079,927 | 3/1978 | Rocton | 269/296 |
| 4,215,319 | 7/1980 | Botez | 331/94.5 H |
| 4,323,327 | 4/1982 | Slack | 269/903 X |
| 4,360,965 | 11/1982 | Fujiwara | 29/569 L X |

FOREIGN PATENT DOCUMENTS

| | | | |
|---|---|---|---|
| 5127015 | 10/1980 | Japan | 29/569 L |
| 57-28375 | 2/1982 | Japan | 29/569 L |

Primary Examiner—Kenneth J. Ramsey
Assistant Examiner—M. Jordon
Attorney, Agent, or Firm—Birgit E. Morris; Theodore R. Furman

[57] ABSTRACT

The invention is a method of soldering a light emitting device to a substrate which uses a vee-groove to hold the substrate, solder and light emitting device in accurate alignment to one another during the melting and solidification of the solder.

7 Claims, 1 Drawing Figure

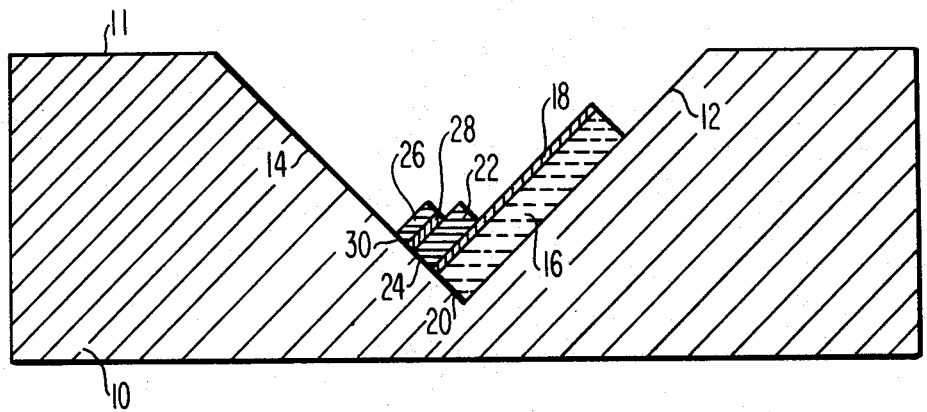

METHOD OF SOLDERING A LIGHT EMITTING DEVICE TO A SUBSTRATE

The invention relates to a method of soldering a light emitting device to a substrate and, in particular, to the accurate alignment of an emitting facet of the device to an edge of the substrate during the soldering process.

BACKGROUND OF THE INVENTION

A light emitting device, such as a semiconductor injection laser or light emitting diode, is typically soldered to a substrate which may be a header or an intermediate such as metallized beryllium oxide (BeO) or diamond which is, in turn, soldered to the header. Preferably, an emitting facet of the device is accurately aligned with an edge of the substrate in order to eliminate partial reflection of an emitted light beam from a substrate, to allow an optical fiber to be brought into close proximity with the emitting facet or to facilitate the alignment of the device with other system components. This alignment is, however, difficult to attain because of the small size of the device and because the device tends to float on the molten solder and move away from its initial accurate alignment to the substrate edge. To realign the facet edge requires moving the device on the molten solder which is both time consuming and risks damage to the device itself.

Thus, it would be desirable to have a method of soldering a light emitting device to a substrate which maintains an accurate alignment of the device and substrate during the melting and solidification of the solder.

SUMMARY OF THE INVENTION

The invention is a method of soldering a light emitting device to a substrate which uses a vee-groove to hold the substrate, solder and light emitting device in accurate alignment to one another during the melting and solidification of the solder.

BRIEF DESCRIPTION OF THE DRAWING

The FIGURE is a cross-sectional view of an assembly comprising a substrate, solder perform and a light emitting device held in a vee-groove during the soldering operation.

DETAILED DESCRIPTION OF A PREFERRED EMBODIMENT

The method of the invention is illustrated with reference to the FIGURE where there is shown a body 10 with a vee-groove in an external surface 11. The vee-groove has first and second internal surfaces 12 and 14, respectively. A substrate 16 having a substrate metallization 18 on a surface thereof is positioned on the first internal surface 12 with an edge face 20 abutting the second internal surface 14. A solder preform 22 overlies the metallized surface 18 and has a preform edge face 24 which abuts the second internal surface 14. A light emitting device 26 having a metallized surface 28 overlies the solder preform 22 and has an emitting facet 30 which abuts the second internal surface 14.

The body 10 is typically composed of a material such as graphite or nickel-coated copper. The internal surfaces 12 and 14 intersect at an angle substantially equal to about 90°. The individual internal surfaces are preferably at an angle of about 45° to the external surface 11 but each may be at an angle between about 30° and 60° so long as the 90° angle between the internal services is maintained.

The substrate 16 is typically a rectangular parallelopiped having planar opposed major surfaces and edge faces perpendicular to the major surfaces. The substrate 16 may be composed of beryllium oxide, diamond, silicon or copper. The composition of the surface metallization 18 depends upon the nature of this substrate. For a beryllium oxide substrate the metallization may be sequential layers of chromium, nickel, copper, nickel and gold deposited by evaporation while for diamond the metallization may be sequential layers of titanium, platinum and gold.

The solder preform 22 is preferably a rectangular parallelopiped whose edge face 24 is perpendicular to its planar opposed major surfaces. The preform 22 may be composed of indium, a lead-tin alloy, a gold-tin, or gold-germanium alloy. Preferably, the solder has a melting temperature of between about 100° C. and about 450° C. For example, an 80 weight percent gold 20 weight percent tin solder preform melts at a temperature of about 280° C.

While the solder has been described as being in the form of a separate preform, it is understood that the preform can be in the form of a layer of solder on the metallized surface of either or both the substrate and the light emitting device.

The light emitting device is typically composed of Group III-V alloys, such as gallium arsenide and aluminum gallium arsenide or indium phosphide and indium gallium arsenide phosphide in the form of a rectangular parallelopiped having an emitting facet 30 which is perpendicular to the major surfaces of the device. The surface metallization 28 differs depending upon the conductivity type of the portion of the device adjacent to the metallized surface 28. For n-type material the metallization typically comprises sequential layers of tin-gold, nickel and gold while for p-type material the metallization is typically sequential layers of titanium, platinum and gold.

The utility of the body 10 lies in the fact that the edge faces of the elements to be soldered together are held in position against the second internal surface 14 by gravity during the heating process with the emitting facet 30 in precise alignment with the edge 20 of the substrate 16.

The method of the invention is practiced by positioning the substrate 16 on the first internal surface 12 of the body 10 with its edge face 20 adjacent to and abutting the second internal surface 14; the solder preform 22 is then positioned on the surface of the substrate with its edge face 24 adjacent to and abutting the second internal surface 14. The light emitting device 26 is then positioned on the solder preform 22 with its emitting facet 30 adjacent to and abutting the second internal surface 14. The assembly including the substrate 16, preform 22 and light emitting device 26 is heated to a temperature sufficient to melt the solder 22 and achieve acceptable wetting of the surfaces of the substrate and the light emitting device 26. The assembly is then cooled down to ambient temperatures to solidify the solder.

It is to be understood that additional pressure may also be between the substrate 16 and the light emitting device 26 to assist in the bonding process.

While the invention is illustrated by the following Example, it is not intended to be limited to the details described therein.

EXAMPLE

A beryllium oxide substrate having a surface metallization composed of sequential layers of chromium, gold, nickel, copper, nickel, gold, nickel and gold was positioned on an internal surface of a nickel-coated copper body whose internal surfaces were oriented at an angle of 45° to an external surface of the body. An 80 weight percent gold 20 weight percent tin solder preform was positioned over the metallization with its faces abutting the second internal surface of the body. A semiconductor injection laser of the type disclosed by Botez in U.S. Pat. No. 4,215,319, incorporated herein by reference, was positioned p-side down on the solder preform. The surface metallization of the semiconductor laser was composed of sequential layers of titanium, platinum and gold. The assembly including the substrate, solder preform and the semiconductor laser were heated to a temperature of 300° C. for 45 seconds and then cooled to ambient temperatures. The emitting facet of the laser was found to be coincident with and in alignment with the edge face of the beryllium oxide substrate.

We claim:

1. A method of soldering a light emitting device to a metallized major surface of a substrate which comprises the steps of:

mounting the substrate on a first internal surface of a vee-groove in an external surface of a body with an edge face of the substrate adjacent to and abutting a second internal surface of the vee-groove having an internal angle substantially equal to 90° with the first internal surface;

positioning the light emitting device over the metallized surface of the substrate with an emitting facet of said device adjacent to and abutting the second internal surface thereby aligning the emitting facet with the edge face of the substrate;

providing a layer of solder between the metallized surfaces of the substrate and the light emitting device;

heating the substrate, the solder and the light emitting device to melt the solder; and cooling the substrate, the solder and the light emitting device to room temperature;

whereby the light emitting device is soldered to the substrate with its emitting facet aligned with the edge face of the substrate.

2. The method of claim 1 wherein the layer of solder is a solder preform positioned over the metallized surface of the substrate so that the edge face of the preform is adjacent to and abuts the second internal surface of the vee-groove and wherein the light emitting device is positioned over the solder preform.

3. The method of claim 2 wherein the internal surfaces of the vee-groove are oriented at an angle between about 30° and about 60° to the external surface of the body.

4. The method of claim 3 wherein the internal surfaces are oriented at an angle of about 45° to the external surface of the body.

5. The method of claim 2 wherein the solder preform is composed of the material selected from the group consisting of indium, a lead tin alloy, a gold tin alloy and a gold-germanium alloy.

6. The method of claim 2 wherein the melting temperature of the solder preform is between about 100° C. and 450° C.

7. The method of claim 1 further comprising the step of applying an external pressure between the light emitting device and the substrate during the step of heating the substrate, the solder and the light emitting device to melt the solder.

* * * * *